(12) United States Patent
Kuang et al.

(10) Patent No.: US 7,398,845 B2
(45) Date of Patent: Jul. 15, 2008

(54) CONTROLLER AND CONTROL METHOD FOR A HYBRID ELECTRIC VEHICLE POWERTRAIN

(75) Inventors: Ming Lang Kuang, Canton, MI (US); Christopher A. Ochocinski, Canton, MI (US); David Mack, Livonia, MI (US); Joseph W. Anthony, Lytle, TX (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/684,868

(22) Filed: Mar. 12, 2007

(65) Prior Publication Data
US 2007/0151781 A1 Jul. 5, 2007

Related U.S. Application Data

(60) Division of application No. 11/293,750, filed on Dec. 2, 2005, now Pat. No. 7,210,546, which is a continuation of application No. 10/605,313, filed on Sep. 22, 2003, now Pat. No. 6,994,360.

(51) Int. Cl.
*B60K 6/365* (2007.10)
*B60W 20/00* (2006.01)

(52) U.S. Cl. ................... 180/65.2; 903/910; 903/943

(58) Field of Classification Search ............... 180/65.2, 180/65.3, 65.4; 701/22; 903/910, 925, 943
See application file for complete search history.

(56) References Cited

U.S. PATENT DOCUMENTS

| | | | |
|---|---|---|---|
| 4,335,429 A | 6/1982 | Kawakatsu | |
| 5,343,970 A | 9/1994 | Severinsky | |
| 5,697,466 A * | 12/1997 | Moroto et al. | 180/65.2 |
| 5,722,502 A | 3/1998 | Kubo | |
| 5,788,006 A * | 8/1998 | Yamaguchi | 180/65.2 |
| 5,806,617 A * | 9/1998 | Yamaguchi | 180/65.2 |
| 5,823,281 A | 10/1998 | Yamaguchi et al. | |
| 5,846,155 A | 12/1998 | Taniguchi et al. | |
| 5,905,360 A | 5/1999 | Ukita | |
| 5,969,624 A | 10/1999 | Sakai et al. | |
| 6,116,363 A | 9/2000 | Frank | |
| 6,209,672 B1 | 4/2001 | Severinsky | |
| 6,328,671 B1 | 12/2001 | Nakajima et al. | |
| 6,336,063 B1 | 1/2002 | Lennevi | |
| 6,362,602 B1 | 3/2002 | Kozarekar | |
| 6,429,613 B2 | 8/2002 | Yanase et al. | |
| 6,453,222 B1 * | 9/2002 | Lasson et al. | 701/22 |
| 6,484,833 B1 | 11/2002 | Chhaya et al. | |

(Continued)

FOREIGN PATENT DOCUMENTS

JP 2000-152420 5/2000

*Primary Examiner*—Frank B Vanaman
(74) *Attorney, Agent, or Firm*—David B. Kelley; Brooks Kushman P.C.

(57) ABSTRACT

A parallel hybrid electric vehicle powertrain and control method wherein an internal combustion engine and an electric motor system define a split power operating mode, a generator drive mode and a parallel power mode. Provision is made, when the motor is inoperable, for preventing discharge of a battery in the electric motor system when the battery state-of-charge is low and for delivering power from the battery when the battery state-of-charge is greater than a predetermined value.

6 Claims, 4 Drawing Sheets

U.S. PATENT DOCUMENTS

| | | |
|---|---|---|
| 6,686,724 B2 | 2/2004 | Coates et al. |
| 6,902,018 B2 | 6/2005 | Hisada et al. |
| 6,991,053 B2 | 1/2006 | Kuang et al. |
| 2003/0074115 A1 | 4/2003 | Yamaguchi et al. |
| 2004/0006414 A1 | 1/2004 | Naoto |
| 2004/0168840 A1 | 9/2004 | Kuang et al. |
| 2005/0061562 A1 | 3/2005 | Mack |
| 2005/0068007 A1 | 3/2005 | Prema et al. |

* cited by examiner

CONTROLLER AND CONTROL METHOD FOR A HYBRID ELECTRIC VEHICLE POWERTRAIN

CROSS-REFERENCE TO RELATED APPLICATION

This application is a division of U.S. application Ser. No. 11/293,750 filed Dec. 2, 2005, entitled "A Controller and Control Method for a Hybrid Electric Vehicle Powertrain", now U.S. Pat. No. 7,210,546, which is a continuation of U.S. application Ser. No. 10/605,313 filed Sep. 22, 2003, entitled "A Controller and Control Method for a Hybrid Electric Vehicle Powertrain", now U.S. Pat. 6,994,360, dated Feb. 7, 2006. Applicants claim the benefit of U.S. application Ser. No. 11/293,750.

BACKGROUND OF THE INVENTION

1. Field of the Invention

The invention relates to a control system for a hybrid electric vehicle powertrain with an engine and electric motor, and to a control method for managing power distribution when the motor is inactive.

2. Background Art

Parallel hybrid electric vehicles of known design include an internal combustion engine and an electric motor, typically a high voltage induction motor, which establish parallel power flow paths to vehicle traction wheels. The powertrain has two power sources. A first power source is a combination of an engine and a generator subsystem with a planetary gear set for distributing power through separate power flow paths. The second is an electric drive system comprising a motor, a generator and a battery. The battery acts as an energy storage medium for the generator and the motor. The generator, in a parallel hybrid powertrain, is driven by the engine.

A mechanical power flow path is established between the engine and the transmission torque output shaft. The other power flow path is an electrical power flow path, which distributes power from the engine to the generator, the latter providing electrical power to the motor driving the torque output shaft of the transmission through gearing.

When the powertrain is operating with the first power source, the engine power is divided between the two paths by controlling the generator speed, which implies that the engine speed can be decoupled from the vehicle speed. That is, the powertrain can act in a manner similar to a continuously variable transmission, where vehicle speed changes do not depend upon engine speed changes.

The foregoing mode of operation is referred to as a positive split.

The powertrain can act also in a mode of operation that may be referred to as a negative split. In this instance, both the engine and generator input power to the planetary gear, which in turn propels the vehicle. In addition, as in the positive split mode, the engine speed can be decoupled from the vehicle speed. The combination of the motor, the generator and the planetary gear set thus function as an electromechanical, continuously variable transmission.

When a generator brake is activated, the powertrain will act in a so-called parallel mode in which engine power output is transmitted with a fixed gear ratio solely through a mechanical power flow path in the drivetrain.

When the first power source is active, it can provide only forward propulsion since there is no reverse gear. The engine requires either a generator speed control or a generator brake to transmit engine output power to the drivetrain for forward motion. When the second power source is active, the electric motor draws power from the battery and provides propulsion independently of the engine for driving the vehicle forward and in reverse. The generator, at that time, can draw power from the battery and drive against a one way clutch on the engine output shaft to propel the vehicle forward. This mode of operation is called "generator drive."

SUMMARY OF THE INVENTION

The powertrain of the present invention maintains power flow paths when the motor subsystem is inactive. The strategy of the present invention will permit the powertrain to be operated without the motor being active and, in this way, a so-called "quit-on-the-road" condition is avoided.

The powertrain engine and the motor generator subsystem function together seamlessly as they deliver torque through a gear system to the vehicle traction wheels. The performance limits of the battery subsystem are not exceeded. When the powertrain is operating under normal conditions with the motor active, the vehicle controller interprets the driver's input (i.e., the reverse, neutral and drive transmission selections and the acceleration or deceleration demand), and then determines when and how much torque each power source needs to meet the driver's demand and to achieve a specified vehicle performance. The vehicle system controller will determine operating speed and torque for the engine to achieve a desired fuel economy and acceptable exhaust gas emissions. On the other hand, when the motor subsystem is inoperable, the vehicle controller determines, based on fault conditions, how the powertrain system should be operated. It determines the power level for each subsystem of the powertrain, which should be achieved to satisfy the driver's demand when the motor is inactive. When the motor subsystem is inactive, for example, the electromechanical, continuously variable feature is lost. As a result, the flexibility of engine operation is limited because the ability to decouple the engine from the driver's torque demand and the vehicle speed is constrained.

If the motor subsystem is inoperable, the engine is required to be running at a given speed based upon the vehicle speed and the battery state-of-charge. At that time, the engine torque has to be proportional to the driver torque demand and the engine speed has to be determined based on the vehicle speed and the battery state-of-charge. Simultaneously, the battery is prevented from overcharging.

The strategy of the present invention will control the powertrain when the motor subsystem shuts down. The engine and the generator subsystem will satisfy the driver's demand at that time. The controller will determine whether the powertrain system should be operated in the generator drive mode, the positive power-split mode, or the parallel power mode. It also determines the engine speed and torque at which the engine should operate.

DETAILED DESCRIPTION OF THE PREFERRED EMBODIMENT

Reference will be made from time-to-time to the term "negative" and "positive" battery power requests. Assuming that there is a battery power request for charging, that request will be considered to be a request for positive power. If the battery power request calls for discharging the battery, that request will be considered to be a request for negative power.

Figure 1:
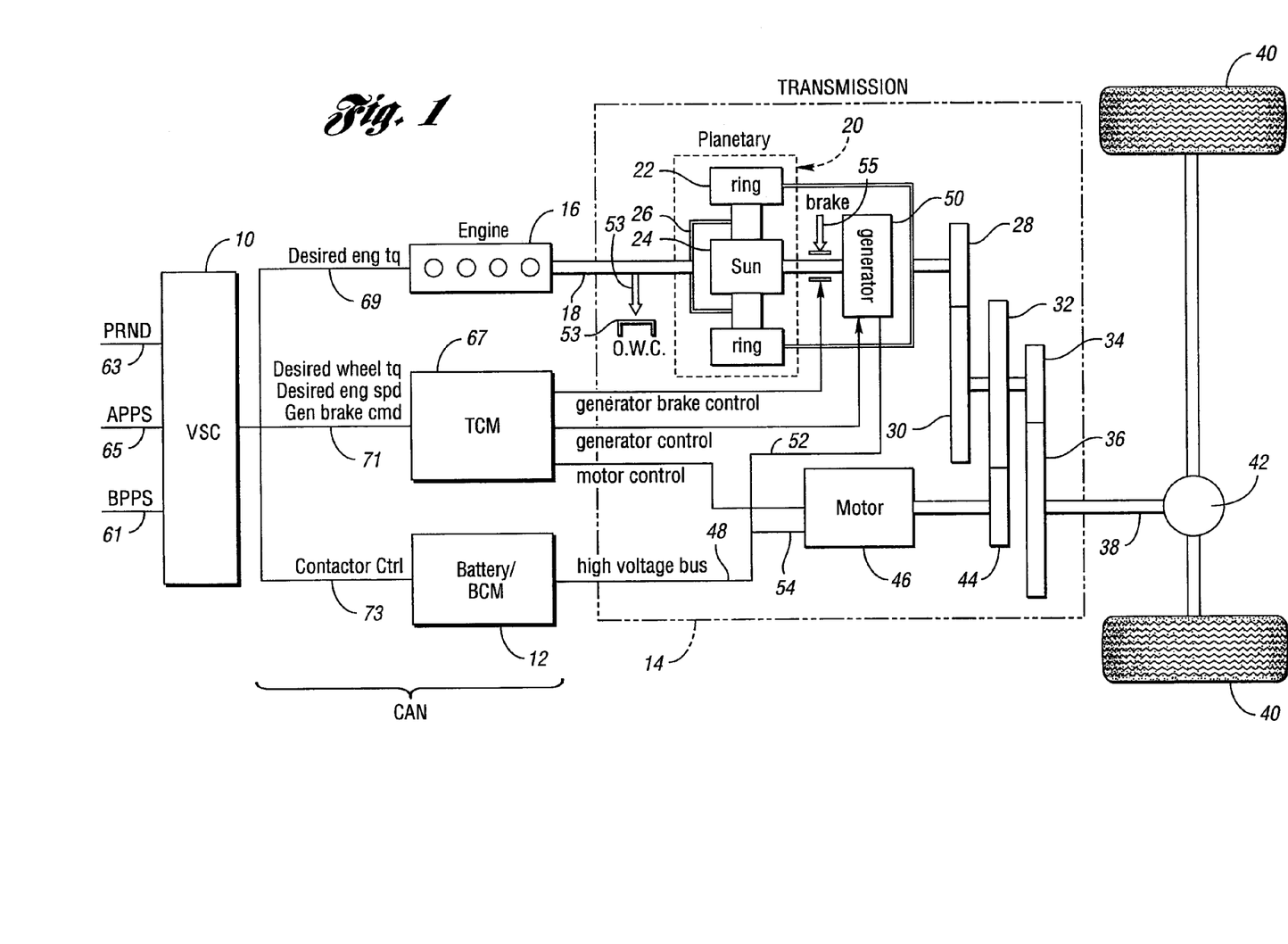
FIG. 1 is a schematic representation of a hybrid electric vehicle powertrain, which includes a controller network, a generator, an electric motor and planetary gearing, which establish torque flow paths to the traction wheels of the vehicle.

The hybrid electric vehicle powertrain of one embodiment of the invention has a configuration, as shown in FIG. 1. A vehicle system controller 10, a battery 12 and a transaxle 14, together with a motor-generator subsystem, comprise a control area network (CAN). An engine 16, controlled by controller 10, distributes torque through torque input shaft 18 to transmission 14.

The transmission 14 includes a planetary gear unit 20, which comprises a ring gear 22, a sun gear 24, and a planetary carrier assembly 26. The ring gear 22 distributes torque to step ratio gears comprising meshing gear elements 28, 30, 32, 34 and 36. A torque output shaft 38 for the transaxle is drivably connected to vehicle traction wheels 40 through a differential-and-axle mechanism 42.

Gears 30, 32 and 34 are mounted on a countershaft, the gear 32 engaging a motor-driven gear 44. Electric motor 46 drives gear 44, which acts as a torque input for the countershaft gearing.

The battery 12 delivers electric power to the motor through power flow path 48. Generator 50 is connected electrically to the battery and to the motor in known fashion, as shown at 52.

When the powertrain battery 12 is acting as a sole power source with the engine off, the torque input shaft 18 and the carrier assembly 26 are braked by an overrunning coupling 53. A mechanical brake 55 anchors the rotor of generator 50 and the sun gear 24 when the engine is on and the powertrain is in a parallel drive mode, the sun gear 24 acting as a reaction element.

In FIG. 1, the vehicle system controller 10 receives a signal from a transmission range selector 63, which is distributed to transmission control module 67, together with a desired wheel torque, a desired engine speed and a generator brake command, as shown at 71. A battery contactor or switch 73 is closed after vehicle "key-on" startup. The controller 10 issues a desired engine torque request to engine 16, as shown at 69, which is dependent on accelerator pedal position sensor output 65.

A brake pedal position sensor distributes a wheel brake signal to controller, as shown at 61. The transmission control module issues a generator brake control signal to generator brake 55. It also distributes a generator control signal to generator 50.

As mentioned previously, there are two power sources for the driveline. The first power source is a combination of the engine and generator subsystems, which are connected together using the planetary gear unit 20. The other power source involves only the electric drive system including the motor, the generator and the battery, where the battery acts as an energy storage medium for the generator and the motor.

Figure 2:
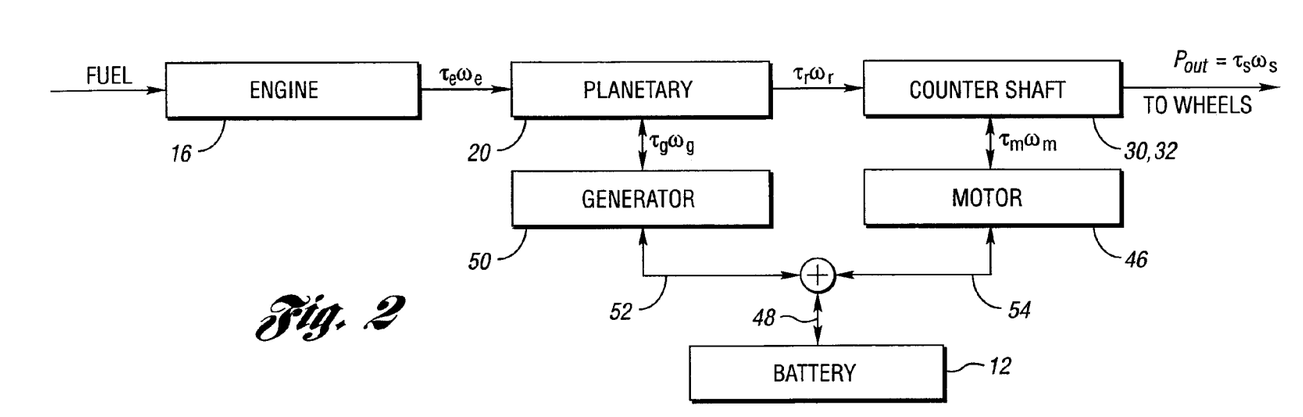
FIG. 2 is a schematic block diagram of a system power flow.

The power flow paths between the various elements of the powertrain diagram shown in FIG. 1 is illustrated in FIG. 2. Fuel is delivered to the engine 16 under the control of the operator in known fashion using an engine throttle. Engine power delivered to the planetary gear unit 20 is expressed as $T_e \omega_e$, where $T_e$ is engine torque and $\omega_e$ is engine speed. Power delivered from the planetary ring gear to the countershaft gears is expressed as $T_r \omega_r$, which is the product of ring gear torque and ring gear speed, respectively. Power out from the transmission 14 is represented by the symbols $T_s$ and $\omega_s$, the torque of shaft 38 and the speed of shaft 38, respectively.

The generator, when it is acting as a motor, can deliver power to the planetary gearing. Alternatively, it can be driven by the planetary gearing, as represented in FIG. 2 by the power flow path 52. Similarly, power distribution between the motor and the countershaft gears can be distributed in either direction, as shown by the power flow path 54. Driving power from the battery or charging power to the battery is represented by the bi-directional arrow 48.

Figure 5:
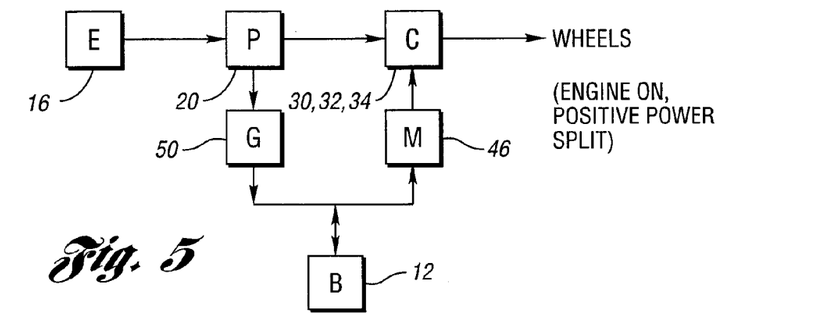
FIG. 5 is a schematic block diagram showing the engine operating and the power flow path with a positive split.

As shown in FIG. 2, engine output power can be split into two paths by controlling the generator speed. The mechanical power flow path, $T_r \omega_r$, is from the engine to the carrier to the ring gear to the countershaft. The electrical power flow path is from the engine to the generator to the motor to the countershaft. The engine power is split, whereby the engine speed is disassociated from the vehicle speed during a so-called positive split mode of operation. This condition is illustrated in FIG. 5, where the engine 16 delivers power to the planetary gearing 20, which delivers power to the countershaft gears 30, 32 and 34, which in turn drive the wheels. A portion of the planetary gearing power is distributed to the generator 50, which delivers charging power to the battery 12. The speed of the generator is greater than zero or positive, and the generator torque is less than zero. The battery drives the motor 46, which distributes power to the countershaft. This arrangement is a positive split.

If the generator, due to the mechanical properties of the planetary gear unit, acts as a power input to the planetary gear unit to drive the vehicle, the operating mode can be referred to as a negative split. This condition is shown in FIG. 6, where the generator speed is negative and the generator torque also is negative.

Figure 6:
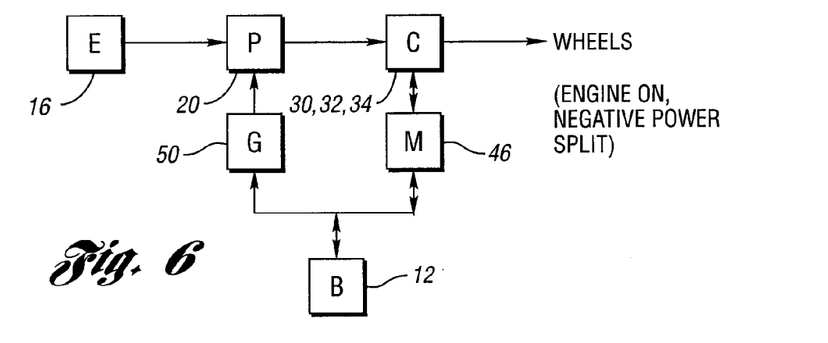
FIG. 6 is a schematic block diagram showing the engine when it is on and the power flow path with a negative split.

The generator in FIG. 6 delivers power to the planetary gear unit 20 as the motor 46 acts as a generator and the battery 12 is charging. It is possible, however, that under some conditions the motor may distribute power to the countershaft gearing if the resulting torque at the wheels from the gearing does not satisfy the driver demand. Then the motor must make up the difference.

Figure 7:
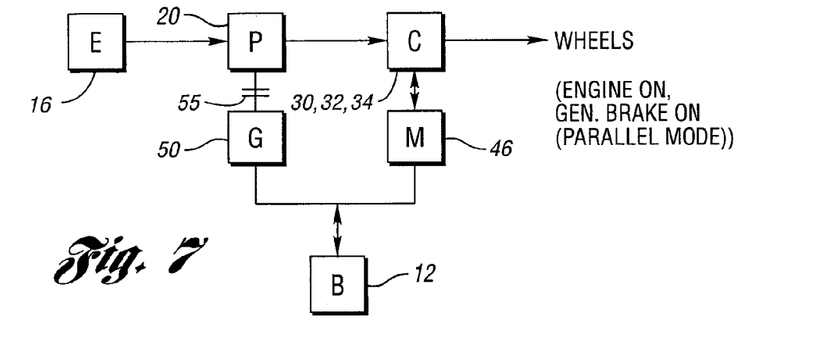
FIG. 7 is a schematic block diagram showing the engine and motor on, wherein a parallel power flow mode is established.

If the generator brake 55 is activated, a parallel operating mode is established. This is shown in FIG. 7, where the engine 16 is on and the generator is braked. The battery 12 powers the motor 46, which powers the countershaft gearing simultaneously with delivery of power from the engine to the planetary gearing to the countershaft gearing.

The first source of power can deliver torque only for forward propulsion because there is no reverse gear in the countershaft gearing. The engine requires either generator control or a generator brake to permit transfer of power to the wheels for forward motion.

Figure 4:
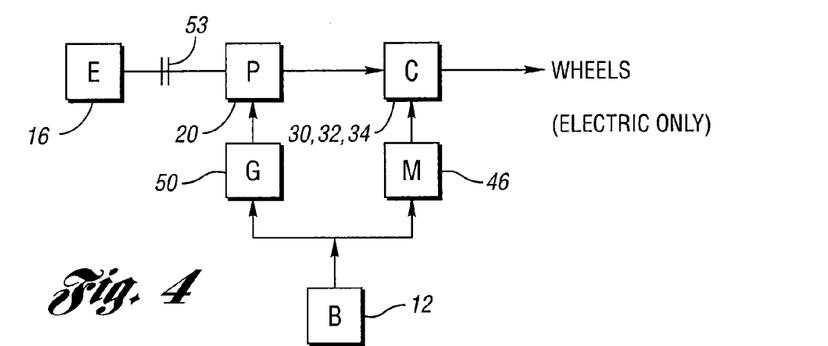
FIG. 4 is a schematic block diagram of a hybrid electric vehicle powertrain wherein the motor, the generator, and the battery act as a sole power source.

The second source of power, previously described, is the battery, generator and motor subsystem. This is illustrated in FIG. 4. In this driving mode, the engine is braked by the overrunning coupling 53. The electric motor draws power from the battery and effects propulsion independently of the engine, with either forward or reverse motion. The generator may draw power from the battery and drive against a reaction of the one-way coupling 53. The generator in this mode operates as a motor.

The control strategy of the present invention will cause the engine to operate, whenever that is possible, to satisfy the driver's demand for power even when the motor subsystem is inactive. This avoids a "quit-on-the-road" condition. This is done while maintaining the battery state-of-charge at or above a target value. Maintaining the state-of-charge at its target value will ensure that the other subsystems that use battery power are functioning normally and that the battery will not be overcharged or overdischarged.

When the electromechanical, continuously variable transmission function is not present due to an inactive motor subsystem, the engine operating point will not be at its optimum value nor at its normal operating point. The engine torque, at that time, must be set to the driver's torque demand multiplied by the gear ratio ($K_1$), which is the ratio of the engine torque to the wheel torque. Further, the engine speed must be selected based on the vehicle speed and the battery state-of-charge. If the battery does not allow charging, for example, the generator speed must be set to zero (the parallel operating mode) since the motor subsystem is inactive. This requires the engine speed to be set to the vehicle speed divided by the gear ratio $K_1$. If the vehicle speed is less than that minimum vehicle speed ($V_{min}$), that ensures the minimum engine speed (e.g., 700 RPM) with zero generator speed (parallel mode), the engine will stall. On the other hand, if the battery requires charging, the system needs to be operated in the positive power-split mode and the engine speed is set to the sum of the vehicle speed divided by the gear ratio $K_1$ and the required charging power divided by the selected engine torque. The engine speed selection is based on the vehicle speed and the battery state-of-charge, which determines whether the battery needs to be charged or discharged.

The determination of the engine torque command ($\tau_{e\_command}$) when the powertrain is operating with the motor subsystem inactive, is achieved as follows:

$$\tau_{wheels} = K_{ring\&wheels} * \tau_{ring}, \quad (1)$$

where $K_{ring\&wheels}$ = torque ratio between ring & wheels $$= K_{ring\&wheels} * \frac{1}{\rho} \cdot \tau_g, \text{ where } \rho = \frac{R_{sun}}{R_{ring}} \text{ and } \tau_g = gen. \text{ torque} \quad (2)$$

$$= K_{ring\&wheels} * \frac{1}{\rho} * \left[\left(\frac{\rho}{1+\rho}\right) * \tau_e\right] \text{ (steady state)} \quad (3)$$

$$= K_{ring\&wheels} * \frac{1}{1+\rho} * \tau_e. \quad (4)$$

$$\tau_{e\_command} = \tau_{wheels} * \frac{1+\rho}{K_{ring\&wheels}} \quad (5)$$

The determination of engine speed command ($\omega_{engine\_command}$), when the powertrain is operating with the motor subsystem inactive, is carried out as follows:

$$P_{wheels} = \tau_{wheels} * \omega_{wheels} \quad (6)$$

-continued $$P_{soc} = \text{Charge power} = K(SOC_{target} - SOC) \quad (7)$$

$$\text{Total Power Requested from Engine} = P_{engine} \quad (8)$$

$$P_{engine} = P_{wheels} + P_{SOC} \quad (9)$$

$$\omega_{engine\_command} = \frac{P_{engine}}{\tau_{e\_command}} \quad (10)$$

$$\omega_{engine\_command} = \frac{P_{wheels}}{\tau_{e\_command}} + \frac{P_{SOC}}{\tau_{e\_command}} \quad (11)$$

$$\omega_{engine\_command} = \frac{\tau_{wheels} * \omega_{wheels}}{\tau_{e\_command}} + \frac{P_{SOC}}{\tau_{e\_command}} \quad (12)$$

$$= \frac{K_{ring\&wheels} * \frac{1}{1+\rho} * \tau_{e\_command}}{\tau_{e\_command}} * \omega_{wheels} + \frac{P_{SOC}}{\tau_{e\_command}} \quad (13)$$

$$= K_{ring\&wheels} * \frac{1}{1+\rho} * \omega_{wheels} + \frac{P_{SOC}}{\tau_{e\_command}} \quad (14)$$

Figure 3:
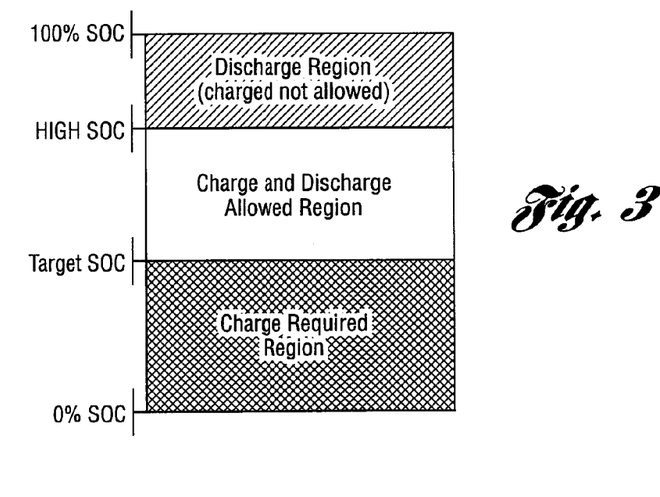
FIG. 3 is a chart that shows the relationship between the battery state-of-charge (SOC) and the charge and discharge requirements.

The relationship between the state-of-charge (SOC) and the charging and discharging requirements is shown in FIG. 3. The graph of FIG. 3 shows that if the battery state-of-charge is above a so-called high state-of-charge ($SOC_h$), the battery needs to be discharged or at least not allowed to be charged. This implies that if the vehicle speed is not greater than the maximum vehicle speed $V_{max}$ at or above which speed the engine is required to be running to prevent the generator from being overspeeded, the powertrain system needs to be operated in the generator drive mode in which the battery is discharging. Otherwise, the powertrain system needs to be operated in the parallel mode, which does not allow charging. The graph of FIG. 3 also shows that if the battery state-of-charge is between $SOC_h$ and the target value $SOC_{target}$, the powertrain system can be operated in either the parallel mode or the positive split mode, depending on the vehicle speed and whether the engine is initially running or not running. Finally, if the battery state-of-charge is less than the target value $SOC_{target}$, the powertrain system is required to be operated in the positive split mode.

Figure 8:
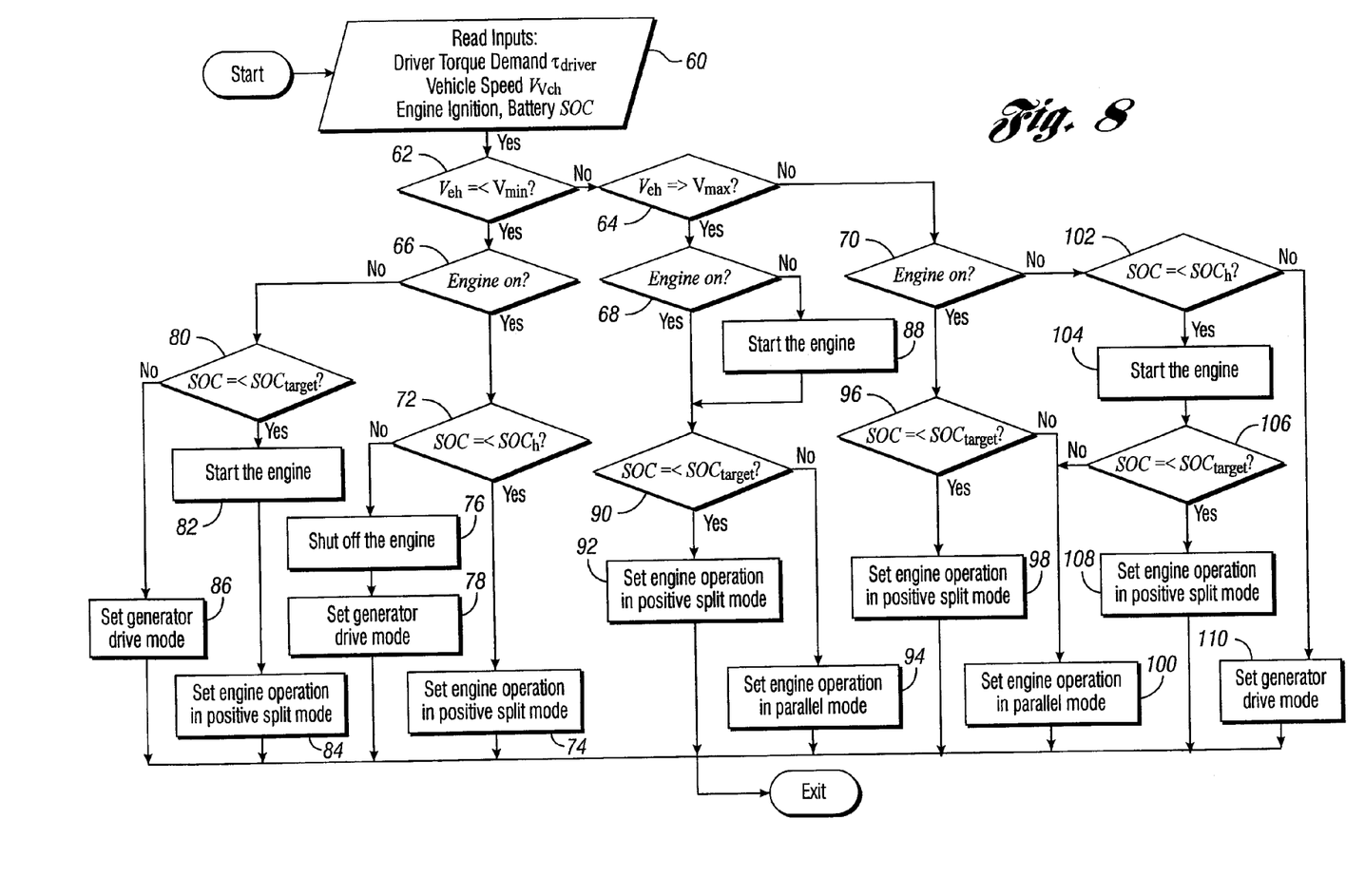
FIG. 8 is a flow chart illustrating the control strategy of the invention.

FIG. 8 is a flow chart that shows the details of the control strategy. In the flow chart, the various inputs to the controller are read, as shown at action block 60. One of these readings is the vehicle speed. The other inputs that are read are the battery state-of-charge and the driver torque demand.

When the vehicle speed is measured, it is determined whether that speed is less than the minimum vehicle speed $V_{min}$, below which the engine will stall, or greater than a predetermined maximum vehicle speed $V_{max}$. A third possibility is that the vehicle speed is between $V_{min}$ and $V_{max}$. These decisions with respect to vehicle speed are determined at decision blocks 62 and 64.

In each of the foregoing routine branches of the diagram of FIG. 8, it is determined whether the engine is on or off. This is done as shown at decision blocks 66, 68 and 70, respectively. If the vehicle is operating in the branch of the routine in which the vehicle speed is less than the minimum, the engine can be on or off, as shown at 66. If the engine is on and the state-of-charge of the battery is less than the value $SOC_h$, as shown at 72, the engine is set for operation in the positive power-split mode, as shown at 74. If the state-of-charge is greater than $SOC_h$, the engine will be shut off, as shown at action block 76. The powertrain then will be set, as shown at action block 78, for operation in the generator drive mode.

If the engine is not on, as determined at decision block 66, the battery is checked to determine whether battery charging is required. This is done at decision block 80, where it is determined whether the state-of-charge is less than the target value. If it is less than the target value, the engine is started, as shown at action block 82, and the engine is set for operation in the positive power mode, as shown at 84. If the state-of-charge determined at decision block 80 is greater than the target value, the engine is kept off and the system is set for operation in the generator drive mode, as shown at action block 86.

If the vehicle speed determined at decision block 64 is greater than a predetermined maximum vehicle speed, the engine is required to be running to prevent the generator from overspeeding. It is determined at decision block 68 whether the engine is running. If the engine is not on, the engine is started at decision block 88. The state-of-charge then is checked at decision block 90 to determine whether it is less than the target state-of-charge. If it is less than the target value, the battery requires charging. Thus, the powertrain is set to operate in the positive split mode, as shown at action block 92. If the state-of-charge is greater than the target value, as determined at decision block 90, the powertrain is set for operation in the parallel mode, as shown at decision block 94.

If the vehicle speed is between the minimum speed and the maximum speed, the engine is checked at decision block 70 to determine whether it is on. This is the preferred condition. If the engine is on when entering this branch of the routine, the battery is checked at decision block 96 to determine whether the battery needs charging. If that is the case, the engine is operating in the positive power-split mode, as shown at action block 98. If the battery does not need charging, the engine is set for operation in the parallel mode, as shown at action block 100.

If, as determined at decision block 70, the engine is not on, and the battery state-of-charge is less than a predetermined high state-of-charge value, as determined at decision block 102, the engine is started, as shown at action block 104. Then, the battery is checked at decision block 106 to determine whether the battery needs charging. If it does not need charging (i.e., SOC >target), a parallel drive mode is set as shown at 100. If it does need charging, the engine is set for operation in the positive split mode, as shown at 108. If the state-of-charge determined at 102 is greater than the value $SOC_h$, and the engine is not allowed to be on, the engine is kept off, and the system is set for operation in the generator drive mode, as shown at 110.

There may be a hysteresis for the target value $SOC_{target}$ in the implementation of this routine. This would eliminate mode hunting between two modes—for example, between the generator drive mode and the positive split mode in the first branch of the routine and between the parallel drive mode and the positive split mode in the other two branches of the routine.

The following shows the desired engine torque and speed and generator torque at which the engine is required to operate in the three modes:

Positive Split Mode:

$$\tau_e = K_1 * \tau_{driver}$$

$$\omega_e = V_{veh}/K_1 + P_{batt}/\tau_e$$

Parallel Mode:

$$\tau_e = K_1 * \tau_{driver}$$

$$\omega_e = V_{veh}/K_1$$

Generator Drive mode:

$$\tau_g = K_2 * \tau_{driver} \text{ (note:} \tau_e = 0 \text{ and } \omega_e = 0)$$

Where:
$\tau_{driver}$—driver's torque demand (NM)
$\tau_e$—desired engine torque (NM)
$\tau_g$—desired generator torque (NM)
$\omega_e$—desired engine speed (radians/sec)
$\omega_g$—desired generator speed (radians/sec)
$V_{veh}$—vehicle speed (M/second)
$P_{batt}$—battery required charging power (Watts)
$K_1$—gear ratio from engine to driven wheels $K_2$—gear ratio from generator to driven wheels It is noted that in positive split mode, the generator is controlled to achieve the desired engine speed (which generates the desired generator torque command), and that in parallel mode, the generator is not required to be in operation.

The control system will operate in accordance with the routine shown in FIG. 8, for example, to provide the driver with an operating capability when the motor subsystem is inactive. The controller further will ensure proper operation of other powertrain subsystems, and will prevent the battery from overcharging.

Although an embodiment of the invention has been disclosed, it will be apparent to persons skilled in the art that modifications may be made without departing from the scope of the invention. All such modifications and equivalents thereof are intended to be covered by the following claims.

What is claimed:

1. A hybrid electric vehicle powertrain comprising an internal combustion engine, a battery, an electric generator, an electric motor and planetary gearing;
   the planetary gearing including a first gearing element drivably connected to the generator, a second gearing element drivably connected to a torque output shaft, and a third gearing element drivably connected to the engine;
   a first brake for preventing rotation of the generator to condition the powertrain for a parallel operating power mode;
   means for preventing rotation of the third gearing element to condition the powertrain for operation in a generator drive mode;
   the generator being electrically coupled to the motor and the battery, the motor being drivably connected to the torque output shaft; and
   a vehicle powertrain controller including means for detecting the state-of-the-charge of the battery and the vehicle speed;
   the controller being configured to set the powertrain for operation in a parallel drive mode when the state-of-charge is greater than a target value and the vehicle speed is less than a predetermined maximum value;
   the controller being configured to set the powertrain for operation in a generator drive mode when the state-of-charge is greater than a predetermined high value and the vehicle speed is less than the predetermined maximum value;
   the controller being configured to set the powertrain for operation in a parallel drive mode when the vehicle speed is greater than the predetermined maximum value and the state-of-charge is greater than a target value, and for operation in a power split drive mode when the vehicle speed is greater than the predetermined maximum value and the state-of-charge is less than the target value.

2. A hybrid electric vehicle powertrain comprising an internal combustion engine, a battery, an electric generator, an electric motor and planetary gearing;

the planetary gearing including a first gearing element drivably connected to the generator, a second gearing element drivably connected to a torque output shaft, and a third gearing element drivably connected to the engine;

a first brake for preventing rotation of the generator to condition the powertrain for a parallel operating power mode;

means for preventing rotation of the third gearing element to condition the powertrain for operation in a generator drive mode;

the generator being electrically coupled to the motor and the battery, the motor being drivably connected to the torque output shaft; and a vehicle powertrain controller including means for detecting the state-of-the-charge of the battery and the vehicle speed;

the controller being configured to set the powertrain for operation in a parallel drive mode when the state-of-charge is greater than a target value and the vehicle speed is less than a predetermined maximum value;

the controller being configured to set the powertrain for operation in a generator drive mode when the state-of-charge is greater than a predetermined high value and the vehicle speed is less than the predetermined maximum value;

the controller being configured to set the powertrain for operation in a power split drive mode when the vehicle speed is less than a minimum value below which the engine will stall and the state-of-charge is less than a high value, and for operation in a generator drive mode when the vehicle speed is less than the minimum value and the state-of-charge is greater than the high value.

3. A hybrid electric vehicle powertrain comprising an internal combustion engine, a battery, an electric generator, an electric motor and planetary gearing;

the planetary gearing including a first gearing element drivably connected to the generator, a second gearing element drivably connected to a torque output shaft, and a third gearing element drivably connected to the engine;

a first brake for preventing rotation of the generator to condition the powertrain for a parallel operating power mode;

means for preventing rotation of the third gearing element to condition the powertrain for operation in a generator drive mode;

the generator being electrically coupled to the motor and the battery, the motor being drivably connected to the torque output shaft; and a vehicle powertrain controller including means for detecting the state-of-the-charge of the battery and the vehicle speed;

the controller being configured to set the powertrain for operation in a parallel drive mode when the state-of-charge is greater than a target value and the vehicle speed is less than a predetermined maximum value;

the controller being configured to set the powertrain for operation in a generator drive mode when the state-of-charge is greater than a predetermined high value and the vehicle speed is less than the predetermined maximum value;

the controller being configured to set the powertrain for operation in a power split mode when the vehicle speed is less than a minimum below which the engine will stall and the state-of-charge is less than the target value, and for operation in the generator drive mode when the vehicle speed is less than the minimum value and the state-of-charge is less than the target value.

4. The hybrid electric vehicle powertrain set forth in claim 3 wherein the controller is configured to operate in a power split mode when the vehicle speed is less than the minimum value and the state-of-charge is less than a predetermined high value.

5. The hybrid electric vehicle powertrain set forth in claim 4 wherein the planetary gearing establishes multiple power flow paths from the engine to the torque output shaft, one power flow path being mechanical as the generator establishes a reaction torque on the first gearing element, another power flow path being electromechanical as electrical power is transmitted from the generator to the motor, whereby the powertrain is conditioned for operation in a power split drive mode.

6. The hybrid electric vehicle powertrain set forth in claim 3 wherein the planetary gearing establishes multiple power flow paths from the engine to the torque output shaft, one power flow path being mechanical as the generator establishes a reaction torque on the first gearing element, another power flow path being electromechanical as electrical power is transmitted from the generator to the motor, whereby the powertrain is conditioned for operation in a power split drive mode.

* * * * *